United States Patent [19]

McGinley et al.

[11] 4,231,802

[45] Nov. 4, 1980

[54] METHOD OF MIXING DIFFICULTY DISPERSIBLE MATERIAL, E.G., FAT OR WAX, IN A GUM-MICROCRYSTALLINE CELLULOSE MATRIX, AND POWDER PRODUCT

[75] Inventors: Emanuel J. McGinley, Morrisville, Pa.; Joseph M. Zuban, Holiday, Fla.

[73] Assignee: FMC Corporation, Philadelphia, Pa.

[21] Appl. No.: 923,501

[22] Filed: Jul. 10, 1978

Related U.S. Application Data

[63] Continuation-in-part of Ser. No. 691,267, Jun. 1, 1976, abandoned.

[51] Int. Cl.$^3$ .......................... A21D 2/18; C08L 1/02
[52] U.S. Cl. .................................. 106/197 C; 106/171; 106/191; 106/199; 106/201; 426/21; 426/24; 426/456; 426/651; 426/653; 426/654
[58] Field of Search ........... 106/163, 170, 271, 197 C, 106/171, 191, 199, 201, 203

[56] References Cited

U.S. PATENT DOCUMENTS

| | | | |
|---|---|---|---|
| 2,609,303 | 9/1952 | Harris | 106/199 |
| 3,258,354 | 6/1966 | Battista | 106/163 |
| 3,278,519 | 10/1966 | Battista et al. | 106/163 |
| 3,357,845 | 12/1967 | Battista | 106/163 |
| 3,440,065 | 4/1969 | LaVia | 106/191 |
| 3,442,676 | 5/1969 | Belfort | 106/271 |
| 3,539,365 | 11/1970 | Durand et al. | 106/163 |

*Primary Examiner*—Murray Tillman
*Assistant Examiner*—A. H. Koeckert
*Attorney, Agent, or Firm*—Charles H. Johnson

[57] ABSTRACT

Oleaginous and other materials that are difficult to form into aqueous dispersions are rendered easily dispersible in cold water by impregnating particles with them which comprise from about 70 to 99 parts of disintegrated beta-1,4 glucan and from about 1 to 30 parts of water-soluble polymer intimately associated therewith, and especially where the particles comprise from about 85 to 95 parts of disintegrated beta-1,4 glucan and from about 5 to 15 parts of sodium carboxymethyl cellulose.

5 Claims, No Drawings

METHOD OF MIXING DIFFICULTY DISPERSIBLE MATERIAL, E.G., FAT OR WAX, IN A GUM-MICROCRYSTALLINE CELLULOSE MATRIX, AND POWDER PRODUCT

This application is a continuation-in-part of application Ser. No. 691,267 filed June 1, 1976, now abandoned.

This invention relates to powders and granules capable of forming stabilized dispersions in cold water of oleaginous and other difficult to disperse materials and to a method of preparing the same.

There are numerous instances in manufacturing and in home operations, notably in food processing but also in operations entirely unrelated to food, where it is desirable to obtain a uniform stabilized dispersion of a powdered or granular form of an oleaginous or other difficult to disperse material in a cold aqueous system. For example, in making bread it would be desirable to have a dry, free-flowing mono- and diglyceride powder which could be added directly to bread dough, the bread dough being a cold, aqueous system. Mono- and diglycerides are widely used in making bread but normally a pre-dispersed hydrate form is necessary to achieve dispersion in the bread dough cold aqueous system.

It is an object of this invention to provide a mechanism whereby oleaginous or other difficult to disperse material can be quickly and conveniently formed into microdispersions in cold water.

A further object of the invention is to provide a method of preparing powders and granules capable of forming in cold water, with only mild agitation, a stabilized micro-dispersion of an oleaginous or other difficult to disperse material.

Other and further objects, features and advantages of the invention will become apparent as the description of a preferred embodiment thereof proceeds.

According to the present invention a matrix of beta-1,4 glucan having a water-soluble polymer intimately associated therewith, has distributed throughout the difficult to disperse material and subsequently is formed into a powdered or granular mass. The individual particles of such mass are impregnated with the difficult to disperse material. The matrix may comprise by weight from about 70 to 99 parts of beta-1,4 glucan and from about 1 to about 30 parts of the water-soluble polymer. In the preferred form of the invention, the matrix comprises by weight from about 85 to about 95 parts of disintegrated beta-1,4 glucan and from about 5 to about 15 parts of sodium carboxymethyl cellulose having a degree of substitution of $0.75\pm0.15$. This preferred form of matrix and a method of making the same are described and claimed in the U.S. patent to Durand et al U.S. Pat. No. 3,539,365, the disclosure of which is hereby incorporated herein by reference. As disclosed in said U.S. Pat. No. 3,539,365, the matrix material is water-insoluble but is readily dispersible in water to form a thixotropic gel. Thus, this invention is not directed toward forming a dispersion of the water-insoluble beta-1,4 glucan-containing material but involves using such material as a means or vehicle for attaining a dispersion of other water-insoluble materials as well as difficult to disperse water-soluble materials.

The invention is accomplished by incorporating the difficult to disperse material into a paste consisting of the matrix component and water. The difficult to disperse material can be mixed with the matrix component prior to adding the water to form a paste or may be added to the paste. A suitable paste is generally attained when the amount of water is between about 10% and about 85% of the total weight of the paste. This limited amount of water causes the individual particles of the matrix to swell thereby opening up the interior of the particles and greatly enlarging the surface area thereof. The difficult to disperse material is then thoroughly stirred into the paste and during the course of this stirring the difficult to disperse material is spread throughout the pasty mass.

If the difficult to disperse material is a liquid at room temperature, the process thus far described may be carried out at room temperature. If the difficult to disperse material is a solid at room temperature, say in the form of a wax, it is necessary to maintain the paste at or about the temperature at which the difficult to disperse material is liquefied. The difficult to disperse material may be liquefied by heat or otherwise before being incorporated into the paste and, in some instances, it will be found that the heat of the paste is sufficient to liquefy the difficult to disperse material. In any event, after and during the stirring of the difficult to disperse material into the paste, heat is employed to drive off the water which was added to form the paste. When the added water has been removed, a free-flowing powder or granular material is obtained.

When the powder or granular material prepared as above described is added to water, the water penetrates the individual particles and causes the particles to expand almost instantly to a considerable extent. In the course of expansion, the difficult to disperse material fragments into exceedingly small pieces forming a microdispersion which, under mild agitation, is readily stabilized.

There is a substantial amount of prior art where one form of beta-1,4 glucan is employed as a carrier or adsorbent to produce a powdered form of certain materials which may be reconstituted to approximately their original non-powdered form. This material is variously referred to as "microcrystalline cellulose", "level-off D.P. cellulose" and "cellulose crystallite aggregates" and is described in detail in U.S. patent to Battista et al., U.S. Pat. No. 2,978,446. The material of the Battista et al. patent is not suitable for carrying out the present invention because the particles of such material do not swell or expand when put in water and therefore do not produce fragmentation of the material adsorbed thereon.

The following are specific examples of ways of carrying out the invention.

EXAMPLE 1

Twenty grams of a liquid mono- and diglyceride was poured into a five quart Hobart mixing bowl. Eighty grams of the preferred matrix substance in dry powder form was added to the bowl. The bowl was then put on a Hobart mixer fitted with a paddle attachment and mixed on slow speed No. 1 for 2–3 minutes to form a crumb. At this point 200 cc water was added and mixing was continued on faster speed No. 2 to form a pasty mass. While heat was applied to the bowl, mixing continued on speed No. 2 until substantially all the added water was evaporated. At this point, application of heat was discontinued while continuing to operate the mixer until the product cooled. The resulting product was a fine free-flowing granular mass. These granules consisted of the aforesaid matrix substance impregnated with the mono- and diglyceride. Five grams of this powder was poured into ninety-five grams of distilled water at 23° C. and two minutes of mild hand stirring resulted in a smooth, viscous dispersion. Examination of the dispersion under a microscope showed a fine distribution of emulsifier globules.

EXAMPLE 2

Ten grams of oleoresin paprika was placed in five quart Hobart mixing bowl. Ninety grams of the preferred matrix substance in dry powder form was added to the bowl. The bowl was then put on a Hobart mixer fitted with a paddle attachment and mixed on speed No. 1 for 2-3 minutes to form a crumb. At this point 200 cc water was added and mixing was continued on speed No. 2 to form a pasty mass. With heat applied to the bowl, mixing was continued until substantially all the added water was evaporated. At this point heat was discontinued while continuing to operate the mixer until the product cooled. The resulting product had the same characteristics for dispersing in cold water as in Example 1.

EXAMPLE 3

Fifteen grams of a solid mono- and diglyceride was melted in a heated five quart Hobart mixing bowl. Eighty-five grams of the preferred matrix substance in dry powder form was added to the bowl. The bowl was then put on a Hobart mixer fitted with a paddle attachment and mixed on speed No. 1 for 2-3 mintues to form a crumb. At this point 200 cc water was added and mixing was continued on speed No. 2 to form a pasty mass. With heat applied to the bowl, mixing was continued until substantially all the added water was evaporated. At this point heating was discontinued while continuing to operate the mixer until the product cooled. The resulting product had the same characteristics for dispersing in cold water as in Example 1.

EXAMPLE 4

Eighty grams of the prefered matrix substance in dry powder form was poured into a five quart Hobart mixing bowl. 200 cc of water was added to the bowl. The bowl was then put on a Hobart mixer fitted with a paddle attachment and mixed on speed No. 2 to form a paste. Twenty grams of a liquid mono- and diglyceride was slowly added into the paste while mixing on speed No. 2. Mixing was continued for 20-30 minutes or until all the mono- and diglyceride was incorporated into the pasty mass. At this point heat was applied to the bowl and mixing continued on speed No. 2 to evaporate substantially all of the added water. Application of heat was then discontinued while continuing to operate the mixer until the product was cool. The resulting product was a free-flowing powder or granular mass. These granules consisted of the aforesaid matrix component impregnated by the mono- and diglyceride. Five grams of this material was poured into ninety-five grams of distilled water at 23° C. and two minutes of mild hand stirring resulted in a smooth, viscous dispersion. Examination of the dispersion under a microscope showed a fine distribution of emulsifier globules.

EXAMPLE 5

Eighty grams of the preferred matrix substance in dry powder form was poured into a five quart Hobart mixing bowl. 200 cc of water was added to the bowl. The bowl was then put on a Hobart mixer fitted with a paddle attachment and mixed on speed No. 2 to form a paste. With heat applied to the bowl, twenty grams of a melted mono- and diglyceride was slowly added into the paste while mixing on speed No. 2. The mono- and diglyceride used is sold commercially as Atmos 150 by ICI United States, Inc., and is a hard wax at room temperature. Mixing was continued until all the Atmos 150 mono- and diglyceride was incorporated into the pasty mass and substantially all the added water was evaporated. At this point application of heat was discontinued while continuing to operate the mixer until the product was cooled. The resulting product had the same characteristics as Example 4.

EXAMPLE 6

Eighty grams of the preferred matrix substance in dry powder form was poured into a five quart Hobart mixing bowl. 200 cc of water was added to the bowl. The bowl was then put on a Hobart mixer fitted with a paddle attachment and mixed on speed N. 2 to form a paste. 0.5 gram of a hydrophylic emulsifier Polysorbate 60 was added to 19.5 grams of a liquid soybean oil to aid in the distribution of the oil throughout the pasty mass. The combined oil and emulsifier was slowly added to the paste while mixing at speed No. 2. At this point heat was applied to the bowl and mixing was continued at speed No. 2 to evaporate substantially all of the added water. Application of heat was then discontinued while continuing to operate the mixer until the product was cool. The resulting product was a free-flowing powder or granular mass. These granules consisted of the aforesaid matrix component impregnated by the soybean oil and the material is useful as a carrier/dispersant for vegetable oils in dry mix dressings, sauces, gravies, etc., capable of forming an oil in water emulsion. Five grams of this material was poured into ninety-five grams of distilled water at 23° C. and two minutes of mild hand stirring resulted in a smooth, viscous dispersion.

It has previously been mentioned that the matrix component may consist of disintegrated beta-1,4 glucan associated with a water-soluble polymer other than sodium carboxymethyl cellulose. Some examples of other polymers that have been found satisfactory are xanthan gum, sodium alginate, carrageenan, tragacanth gum, karaya gum and pregelatinized waxy maize starch.

Having thus described the invention, what is claimed is:

1. A method of preparing powders and granules capable of forming in cold water with only mild agitation, a stabilized micro-dispersion of a difficult to disperse material; said method comprising mixing the difficult to disperse material in liquid form with a matrix comprising by weight from about 70 to about 99 parts of disintegrated beta-1,4 glucan and from about 1 to about 30 parts of a water soluble polymer selected from sodium carboxymethyl cellulose, xanthan gum, sodium alginate, carrageenan, tragacanth gum, karaya gum and pregelatinized waxy maize starch intimately associated with the beta-1,4 glucan, the ratio by weight between the difficult to disperse material and the matrix being not greater than about 1:4, adding sufficient water to swell the matrix and form a paste, said water amounting to from about 10% to about 85% of the weight of the paste, mixing the paste to distribute said difficult to disperse material therethroughout, and continuing to mix while heating the paste to drive off the added water.

2. The method set forth in claim 1 wherein its water-soluble polymer is sodium carboxymethyl cellulose.

3. A method of preparing powders and granules capable of forming in cold water with only mild agitation, a stabilized micro-dispersion of a difficult to disperse material; said method comprising mixing water with a matrix comprising by weight from about 70 to 99 parts of disintegrated beta-1,4 glucan substance and from about 1 to about 30 parts of a water-soluble polymer selected from sodium carboxymethyl cellulose, xanthan gum, sodium alginate, carrageenan, tragacanth gum, karaya gum and pregelatinized waxy maize starch intimately associated with the disintegrated beta-1,4 glucan, said water being used in sufficient quantity to swell the matrix and form a paste, said water amounting to about 10% to about 85% of the weight of the paste, mixing the paste with a difficult to disperse material in liquid form so that said difficult to disperse material is distributed throughout the paste, the ratio by weight between the difficult to disperse material and the matrix being not greater than about 1:4, and heating the paste while continuing the mixing to drive off the added water.

4. The method set forth in claim 3 wherein the water-soluble polymer is sodium carboxymethyl cellulose.

5. A particle made by the method of any of claims 1, 3 or 4.

* * * * *